United States Patent [19]

Suman et al.

[11] Patent Number: 4,792,884
[45] Date of Patent: Dec. 20, 1988

[54] ILLUMINATED VANITY MIRROR VISOR

[75] Inventors: Michael J. Suman; Wesley D. Mersman, both of Holland, Mich.

[73] Assignee: Prince Corporation, Holland, Mich.

[21] Appl. No.: 109,948

[22] Filed: Oct. 19, 1987

[51] Int. Cl.⁴ .................. F21V 33/00; F21V 7/04; F21V 9/00
[52] U.S. Cl. .................... 362/135; 362/31; 362/32; 362/293; 362/324
[58] Field of Search ............ 362/61, 135, 31, 32, 362/293, 322, 324, 282, 142; 296/97 B, 97 H; 350/277

[56] References Cited

U.S. PATENT DOCUMENTS

| | | | |
|---|---|---|---|
| 2,031,642 | 2/1936 | Graf | 240/10 |
| 2,247,969 | 7/1941 | Stewart | 240/1 |
| 2,480,178 | 8/1949 | Zinberg | 362/31 |
| 2,640,909 | 6/1953 | Montgomery | 240/4.2 |
| 2,804,540 | 8/1957 | Columbus et al. | 362/31 |
| 2,900,949 | 8/1959 | Baker | 116/129 |
| 3,029,334 | 4/1962 | Anderson et al. | 240/1 |
| 3,040,168 | 6/1962 | Stearns | 240/2.1 |
| 3,045,111 | 7/1962 | Hoenig | 362/32 |
| 3,144,643 | 8/1964 | Andersson | 362/31 X |
| 3,328,570 | 6/1967 | Balchunas | 362/31 |
| 3,406,475 | 10/1968 | O'Donnell | 40/130 |
| 3,464,133 | 9/1969 | De Poray | 40/130 |
| 3,561,145 | 2/1971 | Shotwell | 40/130 |
| 3,641,334 | 2/1972 | Kipping | 362/135 |
| 3,729,626 | 4/1973 | Thurlow et al. | 240/8.16 |
| 3,737,644 | 6/1973 | Nocek et al. | 240/2.1 |
| 3,792,248 | 2/1974 | Dietz | 240/2.1 |
| 4,039,816 | 8/1977 | Gareis | 240/10 R |
| 4,059,916 | 11/1977 | Tachihara et al. | 40/130 K |
| 4,227,241 | 10/1980 | Marcus | 362/61 |
| 4,257,084 | 3/1981 | Reynolds | 362/31 |
| 4,277,817 | 7/1981 | Hehr | 362/31 |
| 4,314,314 | 2/1982 | Hübner | 362/142 X |
| 4,353,592 | 10/1982 | Cziptschirsch | 296/97 H X |
| 4,371,916 | 2/1983 | De Martino | 362/31 |
| 4,486,819 | 12/1984 | Marcus et al. | 362/142 |
| 4,642,736 | 2/1987 | Masuzawa et al. | 363/31 |

FOREIGN PATENT DOCUMENTS

| | | | |
|---|---|---|---|
| 169168 | 5/1934 | Fed. Rep. of Germany | 362/135 |
| 1021987 | 4/1902 | France | 362/142 |

Primary Examiner—Ira S. Lazarus
Assistant Examiner—Peggy Neils
Attorney, Agent, or Firm—Price, Heneveld, Cooper, DeWitt & Litton

[57] ABSTRACT

An illuminated vanity mirror visor includes a light-transmitting housing which allows the utilization of a single light source such as a bulb which can be located behind the mirror to transmit light to opposite sides of the mirror through integral lenses for directing the light outwardly for use of the mirror in low ambient light conditions. The light-transmitting housing includes opposed spaced and curved light collecting surfaces at legs which extend towards opposite ends of the housing and terminate in integrally molded lens. In an alternative embodiment of the invention, the light source mounted between the facing spaced surfaces of the light-transmitting housing is rotatably mounted and includes multi-colored surfaces such that the color temperature of the light can be varied to provide different lighting effects for the user.

24 Claims, 2 Drawing Sheets

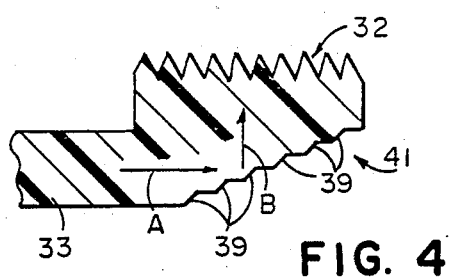
FIG. 4
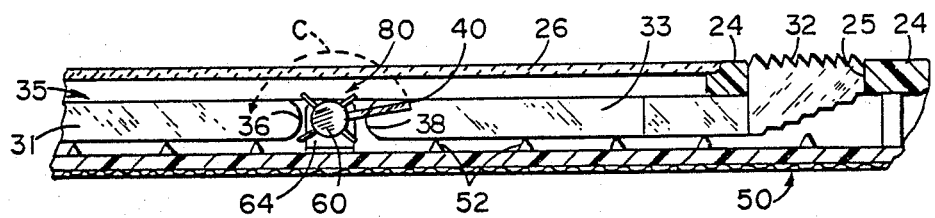
FIG. 5
FIG. 7
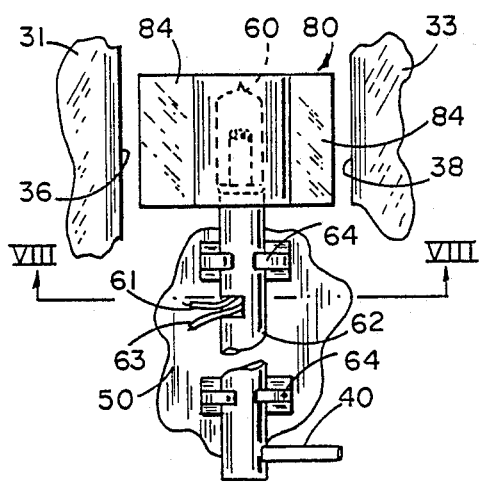
FIG. 6
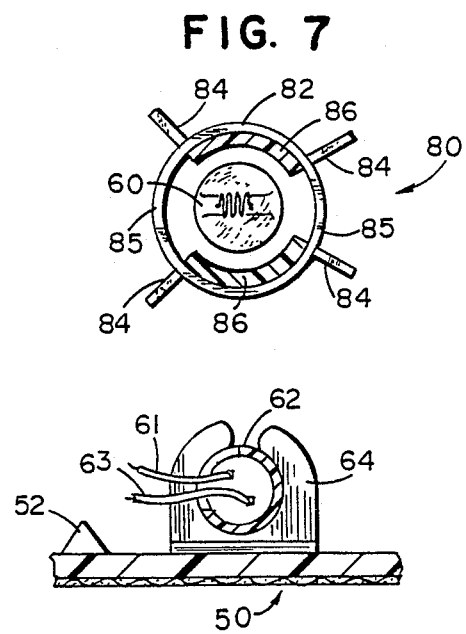
FIG. 8

4,792,884

ILLUMINATED VANITY MIRROR VISOR

BACKGROUND OF THE INVENTION

The present invention relates to a vehicle visor and particularly one which includes an illuminated vanity mirror.

Illuminated vanity mirror visors have become popular for use in vehicles and U.S. Pat. No. 4,227,241 represents an illuminated vanity mirror visor which has become wide-spread in use. The construction of such a visor has typically required the utilization of multiple bulbs and electrical conductors extending from one side of the illuminated vanity mirror to the other for providing separate sources of illumination on either side of the mirror for uniform lighting for the best lighting effect. Although providing the desired illumination levels and distribution, such a system and other lighting arrangements such as disclosed in U.S..Pat. No. 4,486,819 require the utilization of multiple bulbs.

An early proposal for a clip-on illuminated mirror for use in connection with a visor is disclosed in U.S. Pat. No. 2,640,909 in which a cup-shaped housing of transparent material totally surrounds a mirror and a single bulb was placed at the center of the structure for providing light for the mirror around the peripheral frame of the mirror. The level of light available from a single bulb, however, with this type of light dispensing system is unlikely to provide adequate light for most uses and if a layer bulb or bulbs are employed, heat dissipation becomes a problem.

SUMMARY OF THE PRESENT INVENTION

The illuminated vanity mirror visor of the present invention however, incorporates an improved light transmitting housing which allows the utilization of a single light source such as a bulb which can be located behind the mirror to transmit light to opposite sides of the mirror through integral lenses of directing the light outwardly for use of the mirror in low ambient light conditions. The light-transmitting housing is designed to provide opposed spaced light collecting surfaces spaced a relatively narrow distance from one another for the positioning of a light source therebetween. Light from the source is transmitted from these surfaces through the housing legs towards opposite ends of the housing which terminate in integrally molded lenses. In the preferred embodiment of the invention, the light-transmitting housing is generally rectangular as are the lenses formed on opposite ends.

In an alternative embodiment of the invention, the light source mounted between the facing spaced surfaces of the light-transmitting housing is rotatably mounted and includes multi-colored surfaces such that the color temperature of the light can be varied to provide different lighting effects for the user. These and other features objects and advantages of the present invention will become apparent upon reading the following description thereof, together with reference to the accompanying drawings in which:

BRIEF DESCRIPTION OF THE DRAWINGS

FIG. 4 is an enlarged fragmentary cross-sectional view of a portion of the structure shown in FIG. 3;

FIG. 5 is a fragmentary cross-sectional view of the structure shown in FIGS. 2-4 mounted in the mirror frame of FIG. 1 and including a movable light source;

FIG. 6 is an enlarged fragmentary side elevational view of a portion of the structure shown in FIG. 5;

FIG. 7 is an enlarged top plan view of a portion of the structure shown in FIG. 6; and FIG. 8 is an enlarged fragmentary cross-sectional view taken along section lines VIII—VIII of FIG. 6.

DETAILED DESCRIPTION OF THE PREFERRED EMBODIMENT

Figure 1:
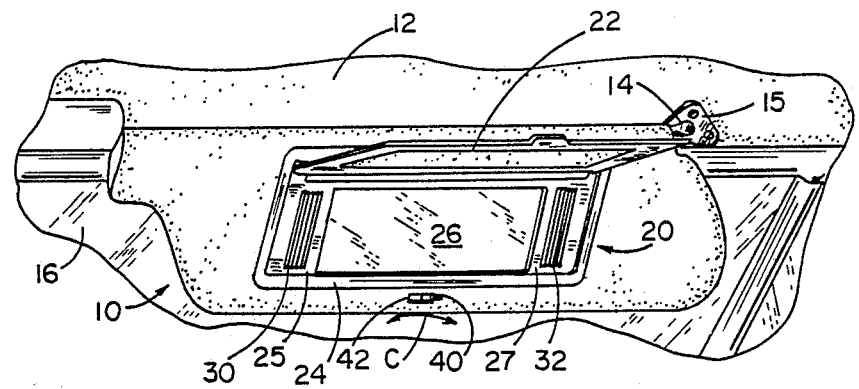
FIG. 1 is a perspective view of an illuminated vanity mirror visor embodying the present invention.

Referring initially to FIG. 1 there is shown a visor 10 which is pivotally mounted to the roof 12 of a vehicle by means of a pivot mounting elbow 14 and bracket 15. The visor 10 pivots between a raised stored position against the roof and a lowered use position adjacent the windshield 16 as shown in FIG. 1.

The visor 10 has a core with sufficient thickness to accommodate an inserted illuminated vanity mirror package 20 embodying the present invention. A cover 22 is pivotally mounted to a frame 24 surrounding the illuminated vanity mirror assembly 20 and can be selectively moved between an open position shown in FIG. 1 to a closed position covering the mirror 26 mounted within frame 24 when not in use. Mounted within the frame 24 and extending on opposite sides of mirror 26 are lenses 30 and 32 which as described in connection with FIGS. 2-4 below, the integral with a light-transmitting housing 35 mounted within the frame 24 behind mirror 26 and extending through apertures 25 and 27 of the frame 24. In one embodiment of the invention, a light color control knob 40 is provided and located centrally below the mirror 26 as seen in FIG. 1 for controlling the light color as described in connection with FIGS. 5-7 below.

Figure 2:
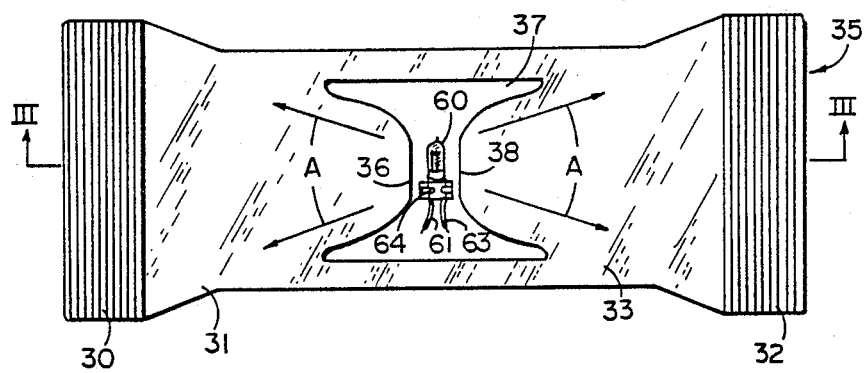
FIG. 2 is a front elevational view of the light-transmitting housing embodying the present invention.
Figure 3:
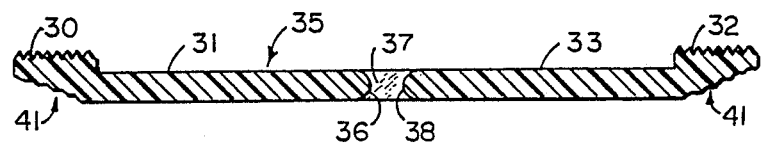
FIG. 3 is a cross-sectional view taken along section lines III—III of FIG. 2.

Referring now to FIGS. 2-4, the light-transmitting and control housing 35 is shown and comprises a generally rectangular member integrally molded of a suitable light-transmissive polymeric material such as a clear acrylic which can be injection molded. The light-transmitting member 35 includes at opposite ends generally rectangular faceted integrally formed lenses 30 and 32 as shown also in FIG. 1. The cross-section of lenses 30 and 32 are wedged-shaped as seen in FIGS. 3 and 4 and communicate with rectangular arms 31 and 33 terminating in curved spaced opposed light receiving surfaces 36 and 38. Surfaces 36 and 38 are spaced a distance of less than about 0.5 inches and in the preferred embodiment, approximately 0.35 inches apart at their center, and each have a radius of curvature of approximately 0.3 inches and 5/16 inches in one embodiment. As seen in FIGS. 2 and 3, the integral member 35 includes a gap 37 into which a light source such as a lamp 60 is positioned for transmitting illumination from the curved light receptive surfaces 36 and 38 outwardly in a direction indicated by arrows A in FIG. 2 to lenses 30 and 32. Gap 37 is generally I-shaped (FIG. 2) to provide maximum light transmission from bulb 60 into member 35 and yet provide an air space for allowing heat from bulb 60 to dissipate.

The bottom surfaces of lenses 30 and 32 include facets 41 as best seen in FIG. 4 for directing light from arms 31 and 33 upwardly towards the surfaces of the lenses as indicated by arrow B in FIG. 4. Facets 41 include inclined surfaces 39 (FIG. 4) which reflect light from legs 31 and 33 toward lenses 30 and 32. Thus, light from a single lamp 60 will be transmitted through legs 31 and 33 outwardly through the lenses 30 and 32 to direct the light forwardly and towards the center of the mirror 26 as seen in FIG. 1 for illuminating the face of a user of the vanity mirror assembly.

The light-transmissive housing 35 is mounted to the mirror frame 24 with lenses 30 and 32 extending through apertures 25 and 27 in frame 24 as best seen in FIG. 5. Member 35 extends behind mirror 26 and is secured to the core 50 of visor 10 by suitable integral mounting ribs 52 by a bonding adhesive or other suitable fastening means which does not interfere with the transmission of illumination along legs 31 and 33. The source of light may be a clear bulb 60 mounted within a suitable bulb socket 62 (FIG. 6) which is snap-fitted within a cradle with resilient arms 64 integrally secured to core 50 as seen in FIGS. 6 and 8. A pair of conductors 61 and 63 lead to switch means (not shown) associated with cover 22 in a covered embodiment of the vanity mirror assembly or other suitable switch means coupling the bulb 60 to the vehicles power source. Attached to the socket 62 is a L-shaped control lever 40 for rotating the socket 62 within cradle 64 approximately 90° for changing the position of bulb 60 with respect to light receiving surfaces 36 and 38 of the light-transmitting housing 35.

Attached to bulb 60 is a color filter assembly 80 which as best seen in FIG. 7, includes a band 82 which snugly fits over the bulb in alignment with the filament as best seen in FIGS. 6 and 7. Band 82 includes four radially extending arms 84 extending outwardly therefrom at equally spaced integrals for limiting light from lamp 60 from interfering with the adjacent arcuate sections of the filter member 80 as defined by arms 84. Between opposite arms are provided open or transparent windows 85 such that light transmitted by the bulb outwardly through windows 85 is typically white light, while between the remaining pairs of arms are provided with colored curved filters 86 which can be, for example, red filters, such that light from bulb 60 is tinted red and the overall effect is a warm pink colored light from lenses 30 and 32 which is more desirable for certain types of facial makeup.

The user may, as illustrated in FIG. 5, rotate arm 40 in a direction indicated by arrow C thereby selectively aligning pairs of arms 84 with light receiving surfaces 36 and 38. Arms 84 are shaped as best seen in FIG. 6, clear surfaces 36 and 38, and yet substantially transmit only light from between adjacent pairs of arms in alignment with one of the surfaces 36 or 38 without interference from the remaining sector of the filter element. By movement of arm 40 therefore, the user may have a fairly bright white light or a relatively subdued warmer toned light. If desired, the filters 86 can be of a different color such as blue to cool the light. Alternatively, blue and red lenses can be employed as opposed to the clear and red or clear and blue combination. In the first embodiment of FIG. 2 only a fixed white light source is employed.

Thus, by the utilization of the light-transmitting housing 30, the light color temperature can be relatively easily changed by the rotation of a single bulb and filter member positioned over the bulb and mounted within a light receiving slot formed in the housing. In the preferred embodiment of the invention, the bulb was a 2-4 candlepower bulb which provided adequate light for normal use under low ambient conditions of the illuminated vanity mirror visor.

The curvature of edges 36 and 38 provide extremely efficient transmission of light into arms 31 and 33 from the light source. Facets 41 and lenses 30 and 32 direct the light in the most advantageous direction for illumination of the face of the user of the mirror. The rectilinear design of the light-transmissive housing 35 together with the curved light receiving surfaces 36 and 38 and I-shaped slot 37 have been found to provide effective focusing of the light from the relatively small light source 60 in a manner which permits a single bulb to be used with similar lighting effects provided with prior art devices using up to four bulbs. Thus, the number of bulbs employed as well as the complicated wiring interconnecting such bulbs, has been significantly reduced with the system of the present invention. Also, in one embodiment a unique color temperature control of the light is provided.

In the preferred embodiment of the invention, the light controlling knob 40 extends through a slot 42 formed in the visor body as best seen in FIG. 1 with the slot having a width sufficient to allow the angular rotation of member 80 approximately 90° to provide the light selective positions. Naturally, the filter 80 can be partially rotated between the extreme positions to provide a blending of different colored lights, if desired.

Various modifications to the preferred embodiments of the invention as described herein can be made by those skilled in the art without departing from the spirit or scope of the present invention as defined by the appended claims.

The embodiments of the invention in which an exclusive property or privilege is claimed are defined as follows.

We claim:

1. A light-transmitting housing for use in connection with an illuminated vanity mirror, said housing comprising:

a generally rectangular integrally molded body of light-transmissive material including lenses formed on opposite ends thereof with surfaces extending along a first surface of said body, said body further including light reflective facet means behind each of said lens means and formed in a surface of said body opposite said first surface, said body further including gap means formed centrally therein and having generally curved facing spaced edges for permitting the positioning of a light source in alignment between said edges, wherein each of said edges includes a surface which is rounded in a plane extending orthogonally to said curved edges bordering said gap means and communicating with said facet means and each of said lens means by means of integral legs such that light from a substantially point light source positioned in said gap between said opposed surfaces will be efficiently transmitted for radiation outwardly from said lens means.

2. The apparatus as defined in claim 1 wherein said gap is generally I-shaped with said edges extending on opposite sides of the center section of said I-shaped gap.

3. The apparatus as defined in claim 2 wherein said body is made of a clear acrylic material.

4. The apparatus as defined in claim 3 and including means for mounting a light bulb within said gap between said opposed surfaces.

5. The apparatus as defined in claim 4 wherein said mounting means includes means for rotatably mounting said bulb within said gap.

6. The apparatus as defined in claim 5 and further including light filter means positioned between said bulb and said edges and coupled to said mounting means for directing different colored light over different accurate sections of said bulb such that when rotated, different color temperature light is received and transmitted by said light-transmitting housing.

7. The apparatus as defined in claim 6 wherein the space between said edges is less than about 0.5 inches.

8. The apparatus as defined in claim 7 wherein the radius of curvature of said rounded surfaces is about 0.3 inches.

9. The apparatus as defined in claim 8 wherein said bulb is about 2 to 4 candlepower.

10. An illuminated vanity mirror visor comprising:
a visor body and means for mounting said visor body to a vehicle;
a mirror and frame means for mounting said mirror to said visor body, said frame means including aperture means adjacent said mirror for receiving lens means for providing illumination for use of said mirror under low ambient light; and
a light transmissive housing mounted to said visor body behind said frame for transmitting light from a single source of light to lens means integral with said housing, said housing comprising a integrally molded body of light-transmissive material including lens means formed along at least one edge thereof and extending along one surface of said body, said body further including a light reflective facet means opposite said lens means, a generally I-shaped gap means formed therein defining a pair of curved opposed facing edges having rounded surfaces communicating with said facet means through integral legs such that light from a source position in said gap between said opposed surfaces will be efficiently transmitted through said body for radiation outwardly from said lens means.

11. The apparatus as defined in claim 10 wherein said body is made of a clear acrylic material.

12. The apparatus as defined in claim 11 and including means for mounting a bulb within said gap between said edges.

13. The apparatus as defined in claim 10 and further including means for mounting a light bulb within said gap.

14. The apparatus as defined in claim 13 and further including light filter means rotatably positioned between said bulb and said opposed surfaces for directing different colored light over different arcuate sections of said bulb such that when rotated, different color temperature light is received and transmitted by said light-transmissive housing.

15. The apparatus as defined in claim 14 wherein the space between said edges is less than about 0.5 inches.

16. The apparatus as defined in claim 15 wherein the radius of curvature of said rounded surfaces is about 0.3 inches.

17. The apparatus as defined in claim 16 wherein said bulb is from about 2 to 4 candlepower.

18. A light-transmitting housing for use in connection with an illuminated vanity mirror, said housing comprising:
a generally rectangular integrally molded body of light-transmissive material including lenses formed on opposite ends thereof with surfaces extending along a first surface of said body, said body further including light reflective facet means behind each of said lens means and formed in a surface of said body opposite said first surface, said body further including gap means formed centrally therein and having generally curved facing spaced opposed edges for permitting the positioning of a light source in alignment between said edges, wherein each of said edges includes a surface which is rounded in a plane extending orthogonally to said curved edges bordering said gap means and communicating with said facet means and each of said lens means by means of integral legs; and
a light source having a length substantially shorter than the length of said gap and positioned in said gap between said opposed surfaces for transmitting radiation outwardly from said lens means.

19. The apparatus as defined in claim 18 wherein said gap is generally I-shaped with said edges extending on opposite sides of the center section of said I-shaped gap.

20. The apparatus as defined in claim 19 wherein said body is made of a clear acrylic material.

21. The apparatus as defined in claim 20 and including means for mounting a light bulb within said gap between said opposed surfaces.

22. The apparatus as defined in claim 21 and further including light filter means for directing different colored light from said bulb such that different color temperature light is received and transmitted by said light-transmitting housing.

23. The apparatus as defined in claim 22 wherein the space between said edges is less than about 0.5 inches.

24. The apparatus as defined in claim 23 wherein the radius of curvature of said rounded surfaces is about 0.3 inches.

* * * * *